(12) United States Patent
Neitzel et al.

(10) Patent No.: US 7,839,890 B1
(45) Date of Patent: Nov. 23, 2010

(54) MULTIPLEXED DATA TRANSMISSIONS THROUGH A COMMUNICATION LINK

(75) Inventors: Lee A. Neitzel, Austin, TX (US); Neil J. Peterson, Austin, TX (US); Teresa A. Chatkoff, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 1014 days.

(21) Appl. No.: 09/704,936

(22) Filed: Nov. 2, 2000

(51) Int. Cl.
*H04J 3/16* (2006.01)

(52) U.S. Cl. ............... 370/468; 370/410; 370/229; 370/236; 370/428; 370/395.2; 370/395.4; 370/395.41; 370/395.42

(58) Field of Classification Search ............ 370/468, 370/410, 229, 230, 235, 236, 428, 412, 395, 370/395.4, 395.41, 395.42, 395.43, 395.2
See application file for complete search history.

(56) References Cited

U.S. PATENT DOCUMENTS

| | | | | |
|---|---|---|---|---|
| 4,926,415 A | * | 5/1990 | Tawara et al. | 370/231 |
| 5,003,534 A | * | 3/1991 | Gerhardt et al. | 370/322 |
| 5,204,949 A | | 4/1993 | Yasue et al. | |
| 5,420,866 A | * | 5/1995 | Wasilewski | 370/426 |
| 5,687,167 A | * | 11/1997 | Bertin et al. | 370/254 |
| 5,757,784 A | * | 5/1998 | Liebowitz et al. | 370/321 |
| 5,812,545 A | * | 9/1998 | Liebowitz et al. | 370/337 |
| 5,886,995 A | * | 3/1999 | Arsenault et al. | 370/477 |
| 5,926,458 A | * | 7/1999 | Yin | 370/230 |
| 5,987,061 A | * | 11/1999 | Chen | 375/222 |
| 6,018,515 A | * | 1/2000 | Sorber | 370/229 |
| 6,046,817 A | * | 4/2000 | Brown et al. | 358/1.16 |
| 6,209,018 B1 | * | 3/2001 | Ben-Shachar et al. | 718/105 |
| 6,240,073 B1 | * | 5/2001 | Reichman et al. | 370/319 |

(Continued)

FOREIGN PATENT DOCUMENTS

EP    0 779 720 A2    6/1997

(Continued)

OTHER PUBLICATIONS

Ernst et al., "Space Communications Protocol Standards (SCPS) Bent-Pipe Experiment Report," (May 1996).

(Continued)

*Primary Examiner*—Ayaz R Sheikh
*Assistant Examiner*—Andrew C Lee
(74) *Attorney, Agent, or Firm*—Marshall, Gerstein & Borun LLP

(57) ABSTRACT

A communication technique enables the efficient transmission of data through a communication link having a large delay bandwidth product and/or a high bit error rate. The communication technique multiplexes data from one or more data sources through a plurality of communication connections to increase the overall throughput and to reduce the average data transfer delay of the communication link. Each communication connection has a set of communication connection parameters that may be uniquely configured so that each connection carries a particular type of data at a particular effective priority level. Each communication connection may be uniquely configured to have a particular sending buffer size, to deliver messages having a particular length to an underlying layer and to send the messages into the link at a particular rate to orchestrate the manner in which the communication connections send data through the link.

55 Claims, 9 Drawing Sheets

U.S. PATENT DOCUMENTS

| | | | |
|---|---|---|---|
| 6,377,561 B1 * | 4/2002 | Black et al. ................. | 370/330 |
| 6,415,329 B1 * | 7/2002 | Gelman et al. .............. | 709/245 |
| 6,460,085 B1 * | 10/2002 | Toporek et al. ............. | 709/233 |
| 6,463,040 B1 * | 10/2002 | Dutta ......................... | 370/280 |
| 6,483,839 B1 * | 11/2002 | Gemar et al. .......... | 370/395.42 |
| 6,522,638 B1 * | 2/2003 | Haugli et al. ............... | 370/329 |
| 6,618,378 B1 * | 9/2003 | Giroux et al. ........... | 370/395.1 |
| 6,654,344 B1 * | 11/2003 | Toporek et al. ............. | 370/230 |
| 6,711,379 B1 * | 3/2004 | Owa et al. ................. | 455/3.01 |
| 6,807,667 B1 * | 10/2004 | Bar et al. .................... | 719/320 |
| 6,819,658 B1 * | 11/2004 | Agarwal et al. ............. | 370/316 |
| 6,839,332 B1 * | 1/2005 | Agarwal et al. ............. | 370/321 |
| 6,985,455 B1 * | 1/2006 | Heath et al. ................. | 370/316 |
| 7,027,414 B2 * | 4/2006 | Walsh et al. ................ | 370/316 |
| 7,213,077 B2 * | 5/2007 | Border ....................... | 709/234 |
| 2001/0043573 A1 * | 11/2001 | Kelly .......................... | 370/316 |
| 2001/0048670 A1 * | 12/2001 | Kelly et al. ................. | 370/316 |
| 2002/0003776 A1 * | 1/2002 | Gokhale et al. ............. | 370/236 |
| 2002/0046264 A1 * | 4/2002 | Dillon et al. ................ | 709/219 |
| 2003/0032429 A1 * | 2/2003 | Macridis et al. ............. | 455/435 |

FOREIGN PATENT DOCUMENTS

| | | |
|---|---|---|
| EP | 1 045 522 A1 | 10/2000 |
| EP | 1 077 576 A1 | 2/2001 |
| GB | 2 326 315 A | 12/1998 |
| JP | 10-215253 | 8/1998 |
| JP | 11-041200 A | 2/1999 |
| JP | 11-317754 | 11/1999 |
| JP | 2000-020428 | 1/2000 |
| WO | PCT/US99/25777 | 5/2000 |

OTHER PUBLICATIONS

Durst et al., "Final Report of the SCPS-TP Testing on the UK DRA STRV," vol. 1, (Sep. 1996).

Sepmeier, "Worldwide TCP/IP Using Satellites the Great Debate," NSN Network Services, Avon, Colorado (1997).

"Internet Technical Handbook" May 1997.

Brosi, "Space Communications Protocol Standards (SCPS): Rationale, Requirements and Application Notes," CCSDS 710.0-G-0.3 (Jun. 1997).

NASA Advanced Communications Technology Satellite (ACTS) Program Summary (Aug. 1997).

Durst et al., "TCP Extensions for Space Communications," (Mar. 1998).

Travis et al., "A Journeyman's Perspective on Transport in a Satellite Environment," (Mar. 1998).

Zhang et al., "A Measurement of TCP over Long-Delay Network," (Mar. 1998).

"High Performance Interoperable Satellite and Terrestrial Data Link Protocol (HIPI-DLP)," MiTech, Inc., (Dec. 1998).

Allman et al., "Enhancing TCP Over Satellite Channels Using Standard Mechanisms," (Jan. 1999).

Notice of Reasons of Rejection for Application No. 2001-338464, dated Oct. 30, 2007.

Notice of Reasons for Rejection for corresponding Japanese Application No. 2001-338464, dated Sep. 30, 2008.

Notice of Reason for Rejection, dated Nov. 4, 2009.

Japanese Patent Abstract Publication No. 05-053939, dated Mar. 5, 1993.

Japanese Patent Abstract Publication No. 09-023285 dated Jan. 21, 1997.

Japanese Patent Abstract Publication No. 11-242640, dated Sep. 7, 1999.

Japanese Patent Abstract Publication No. 2000-020428 dated Jan. 21, 2000.

International Patent Application Publication No. WO 00/46669 dated Aug. 10, 2000.

* cited by examiner

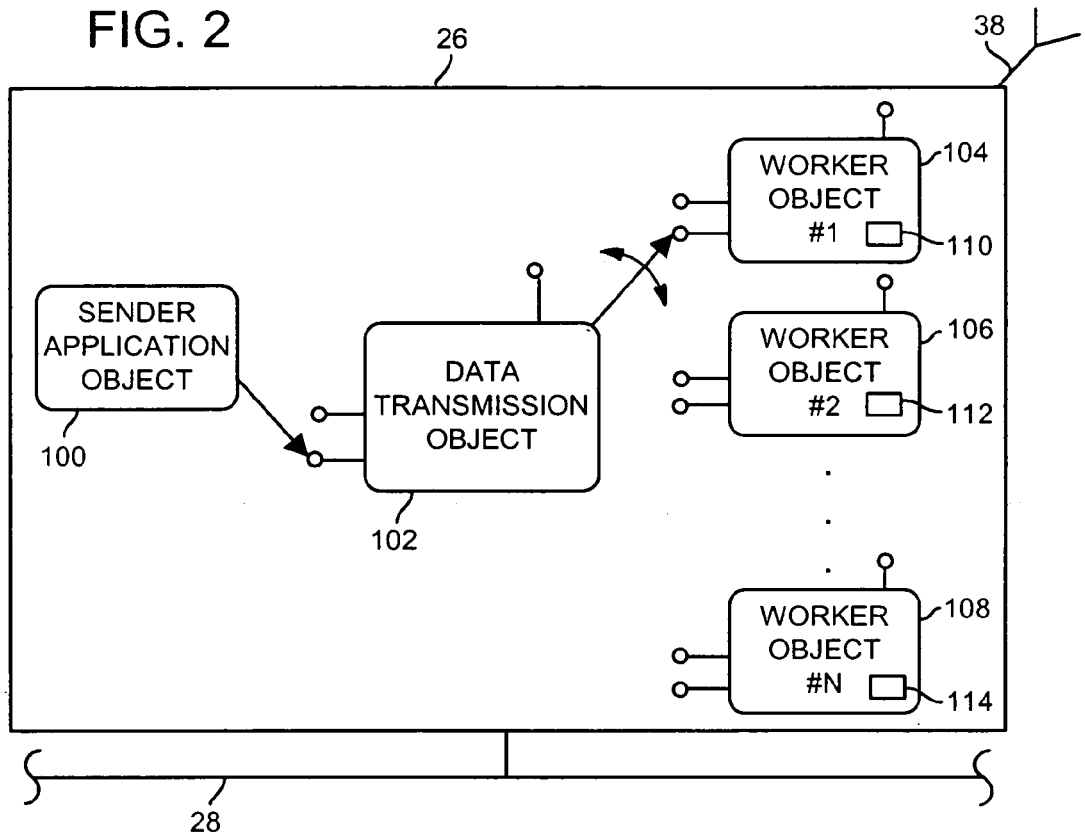
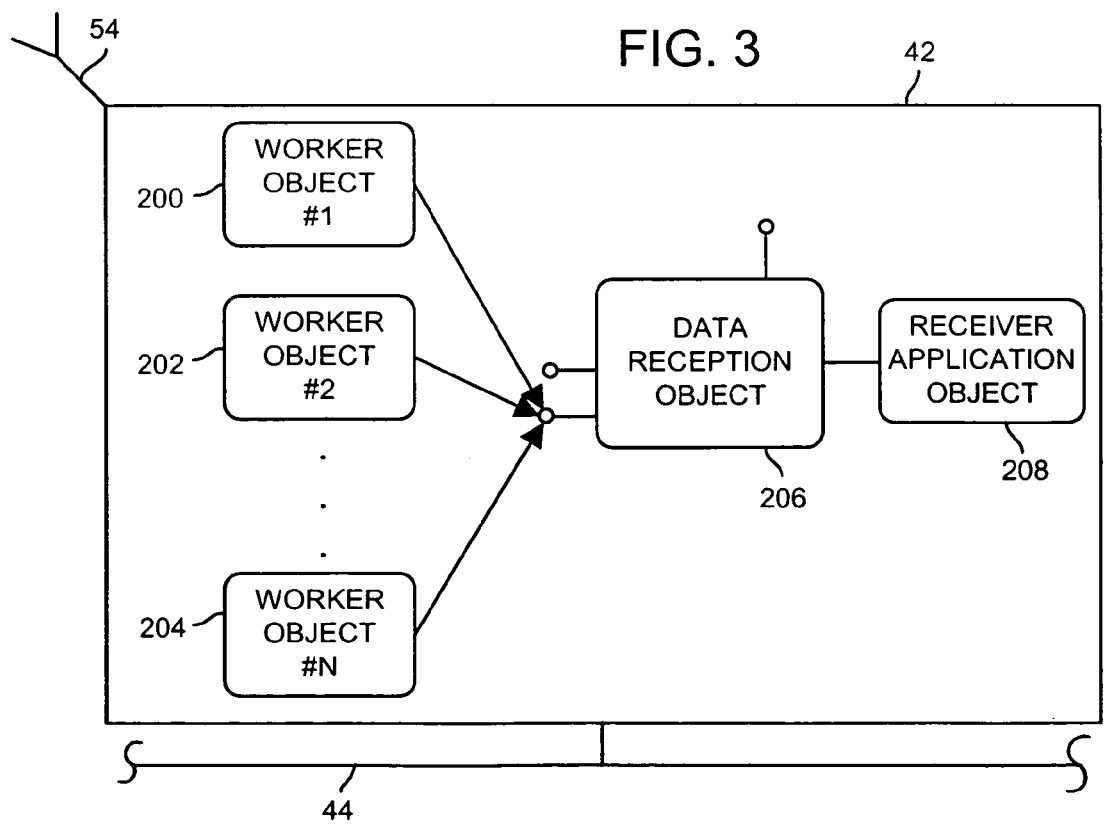

| CONNECTION | MSG SIZE (BYTES) | $\frac{1}{TBC}$ (Hz) | BW utilization kb/s |
|---|---|---|---|
| 1 | 8192 | 49 | 20.8 |
| 2 | 3072 | 30 | 4.8 |
| 3 | 4096 | 69 | 14.4 |
| 4 | 3072 | 30 | 4.8 |
| RESERVE | 8192 | 46 | 19.2 |
| | | Total BW Utilization | 64 kb/s |

MULTIPLEXED DATA TRANSMISSIONS THROUGH A COMMUNICATION LINK

FIELD OF THE INVENTION

The invention relates generally to communication systems and, more specifically, to a communication technique that multiplexes data through a plurality of communication connections to increase data throughput and to reduce the average data transfer delay in communication links that have high delay bandwidth product and/or a high bit error rate.

DESCRIPTION OF THE RELATED ART

Process control networks, such as those used in chemical, petroleum or other processes, generally include one or more centralized process controllers communicatively coupled to one or more field devices which may be, for example, valve positioners, switches, sensors (such as temperature, pressure and flow rate sensors), etc. These field devices may perform physical control functions within the process (such as opening or closing a valve), may take measurements within the process for use in controlling the operation of the process or may perform any other desired function within the process. Generally speaking, the process controller receives signals indicative of measurements made by one or more field devices and/or other information pertaining to the field devices, uses this information to implement a typically complex control routine and generates control signals which are sent via the signal lines or buses to the field devices to control the operation of the process.

Furthermore, the process controllers are generally coupled via a data highway, such as an Ethernet bus, to one or more workstations and other devices such as data historians, etc. These other devices typically run other applications or programs that use the information provided by the one or more controllers, such as providing a user interface to the control routine, enabling modification or updating of the control routine, interfacing with the field devices, etc. In some process control systems, one or more workstations located at a remote site may be coupled to the data highway via a further communication network, such as an Internet connection, a satellite or cellular communication link, a radio link (as used in wireless Ethernet connections), etc. Typically, data is transmitted through these further communication links as data packets that each contain one or more data bytes typically associated with one or more process control messages. Each data packet also typically includes encapsulation data such as protocol headers, error checking fields, flags, etc. to facilitate the transmission and reception of data packets through the communication link. Because these further communication links are wireless or are shared hardwired links, the bandwidth available for the delivery of data associated with the process control system is typically much lower than that of the dedicated data highway. Furthermore, many of these remote links use communication protocols similar to those used in the local data highway that employ error detection and correction schemes, which add additional overhead to the messages being sent, or message receipt acknowledgments that increase the time it takes to send data over the link. In any event, these communication protocols make inefficient use of the available communication link bandwidth and typically have relatively large data transfer delays.

Generally speaking, communication techniques provide a particular level of data throughput at a desired level of data integrity. Typically, a system designer selects an appropriate communication technique for an application by balancing the inherent tradeoffs between the data throughput and the data integrity provided by each of the available communication techniques against system cost objectives. In some applications, such as those involving communications between locally situated devices, like control devices, controllers, and workstations used in process control systems, a dedicated high speed databus (e.g., Ethernet) can be used to provide high levels of data throughput and integrity at a relatively low cost. In other applications, such as those involving communications between local and remotely situated devices (like control devices, controllers, and workstations used in process control systems), practical considerations and limitations compel system designers to use communication links, such as modem links, wireless cellular links, satellite links, etc. that have a relatively low bandwidth or links that have a high delay bandwidth product and/or a high bit error rate.

Using the above-mentioned communication links to accomplish communications between local and remote systems presents several significant problems. For example, satellite communication links typically have a high bit error rate that results in the retransmission of data which is lost or corrupted during transmission. The retransmission of data, particularly in combination with the large transmission time delay through the satellite link, substantially decreases the throughput of the link and increases the data transfer delay of the link. Additionally, the above-rioted communication links are often associated with purchased services such as telephone lines, cellular channels or channel allocation within a satellite transponder bandwidth, which can result in a significant cost per unit of data sent through the link. Thus, communication techniques that increase data integrity through a communication link with minimal communication overhead and communication techniques that pack a communication link with data in both the temporal and frequency dimensions of the link are highly desirable because they increase data throughput for a given communication link bandwidth and reduce the cost per unit of data sent through the link.

For many applications, acceptable levels of data integrity and costs per unit of data sent can be achieved using conventional data encoding and channel modulation techniques within a one-way communication link. One-way communication techniques are commonly referred to as "connectionless" because they do not use acknowledgment messages to confirm that data has been properly transmitted through a communication link. For instance, digital audio and video data is encoded prior to transmission using some type of forward error correction and/or convolutional encoding and may be effectively transmitted through a one-way communication link using a spread spectrum modulation technique. A receiving station may then demodulate and decode the transmitted data to generate audio and video signals having an acceptable integrity level. Because the receiving station does not communicate with the transmitting station (e.g., by using acknowledgment messages), corrupted data or lost data may not be recovered by the receiving station, thereby causing spurious errors within the video and audio signals provided to a user. While these spurious errors are undesirable, they do not have a significant impact on overall system performance because they are not easily perceived by a user. In this manner, communication protocols for the transmission of digital audio and video data can eliminate the communication overhead that is normally associated with two-way communication techniques which use a full-handshake communication protocol (e.g., by sending acknowledgment messages), without adversely affecting the qualitative performance of the system.

While the above-described approaches to transmitting data through a one-way communication link provide an acceptable level of data integrity for the reproduction of audio and video information, these approaches do not provide a level of data integrity suitable for use in some other types of applications. For example, data associated with a process control system, such as data related to alarm conditions, may be of a highly critical nature because missing or corrupted alarm data may result in injury to personnel and/or damage to material, plant equipment, etc. Furthermore, one-way or connectionless communication techniques are generally not suitable for use with process control systems because it is highly desirable (and often a requirement) for a local transmitting station to recognize that a remote receiving station is actually receiving and processing the data sent to it by the transmitting station.

Traditionally, applications that require a relatively high level of data integrity (such as process control applications) and that use a communication link (such as a satellite link) having a large delay bandwidth product and/or a high bit error rate have used a two-way or connection-oriented communication technique such as transmission control protocol (TCP), that provides a full-handshake communication scheme. With connection-oriented communication techniques, the transmitting station requires a window (i.e., number) of transmitted data bytes or packets to be acknowledged by the receiving station before sending any subsequent data. As a result, if the round trip transmission time delay of the communication link is greater than the window transmission time (i.e., the time required to send a full window of data bytes into the link), then the link will remain idle from the time the last data byte within the window is sent until an acknowledgment from the receiving station is received by the transmitting station. While these conventional connection-oriented communication techniques provide an acceptable level of data integrity in, for example, process control systems, and allow the local transmitting station to ascertain whether or not the remote receiving station is receiving and processing the transmitted data, these techniques generally result in a low communication link throughput and significant data transfer delays, which is highly disadvantageous where a great magnitude of critical data, such as alarm information within a process control system, is transmitted.

Connection-oriented communication techniques are especially problematic when used in conjunction with satellite communication links because these links have a high bandwidth and a round trip channel transmission time delay of several hundred milliseconds (i.e., satellite communication links have a large delay bandwidth product). The relatively large round trip transmission time delay of satellite communication links results in a significant amount of communication link idle time because the transmitting station waits for an acknowledgment of each window of transmitted data bytes before reopening the window to transmit subsequent data packets. Additionally, sending a large amount of information (e.g., from a local workstation to a remotely situated workstation) may be perceptibly or even impractically slow for a user requesting the information. In any case, the inefficient use of the satellite communication link results in an unacceptably high cost per unit of data transmitted.

To improve the efficiency with which the above-described two-way communication techniques transmit data through communication links having a large delay bandwidth product and/or a high bit error rate, system designers have employed communication techniques that establish multiple connections within a communication link to provide multiple communication paths or pipelines for sending data through the communication link. As is commonly known, these multi-connection communication techniques can more effectively temporally pack a communication link having a large delay bandwidth product than can single connection communication techniques. In particular, with these multi-connection communication techniques, if one connection has sent a full window of data and is idle waiting for an acknowledgment from a receiving station, one or more of the other connections that have not sent a full window of data may continue to send data into the link.

Unfortunately, system designers have traditionally viewed the transport layer of the communication processes used within the above-mentioned multi-connection communication techniques as an end-to-end mechanism that is directly coupled to data sources and sinks such as the process control applications, controllers, field devices, user interfaces, etc. that are delivering messages for transmission through the communication link to the transport layer. As a result, each communication connection is allowed to operate in an asynchronous and independent manner with respect to the other communication connections and the data sources. Additionally, all of the communication connections are usually configured in an identical manner using parameters associated with optimal performance for an individual connection. Because these multi-connection communication techniques do not coordinate the operation of the multiple communication connections or the manner in which data is passed from the data sources to the communication connections, the throughput and average data transfer delay of the communication link as a whole may be far from optimal. Instead, competition between the communication connections for the same data and/or other system resources, multiple connections attempting to transmit data into the link at the same time, etc. may substantially limit the overall throughput of the communication link and increase data transfer delays through the link.

SUMMARY OF THE INVENTION

A communication technique orchestrates the multiplexing of data from one or more data sources through a plurality of communication connections to increase the throughput and to reduce the average data transfer delay of a communication link. More specifically, the communication technique described herein may uniquely configure each communication connection to carry a particular type of data at a particular effective priority level. Additionally, each communication connection may also be uniquely configured to have a particular sending buffer size, to process system messages having a particular length and to send the system messages to an underlying layer of the communication link at particular rate. As a result, the communication technique described herein enables a comprehensive orchestration over the manner in which the plurality of communication connections sends data into the communication link to improve the throughput of the communication link as a whole and to reduce the average data transfer delay of the link.

According to one aspect of the invention, a communication system and method enables the transmission of data through a communication link having a bandwidth using a plurality of communication connections. The system and method establishes a worker object for each one of the communication connections and distributes the data amongst the worker objects. Additionally, the system and method may form messages using the distributed data within each worker object and may deliver the messages to an underlying layer of the plurality of communication connections so that each communication connection uses no more than a predetermined portion of the bandwidth.

According to another aspect of the invention, a system for transmitting data through a communication link using a plurality of communication connections includes a communication process that partitions the data to form a plurality of partitioned data streams and a plurality of worker processes that each have a set of uniquely configurable communication parameters. Each of the worker processes receives the partitioned data from a corresponding one of the plurality of partitioned data streams and delivers messages containing the partitioned data to an underlying layer of the plurality of communication connections based on the set of uniquely configurable communication parameters for that worker process.

BRIEF DESCRIPTION OF THE DRAWINGS

FIG. 2 is an exemplary schematic block diagram that depicts one manner in which the sending communication gateway of FIG. 1 may be configured to multiplex process control data through a plurality of communication connections within a communication link;

FIG. 3 is an exemplary schematic block diagram that depicts one manner in which the receiving communication gateway of FIG. 1 may be configured to receive the multiplexed data transmissions of the sending communication gateway shown in FIG. 1;

DESCRIPTION OF THE PREFERRED EMBODIMENTS

Figure 1:
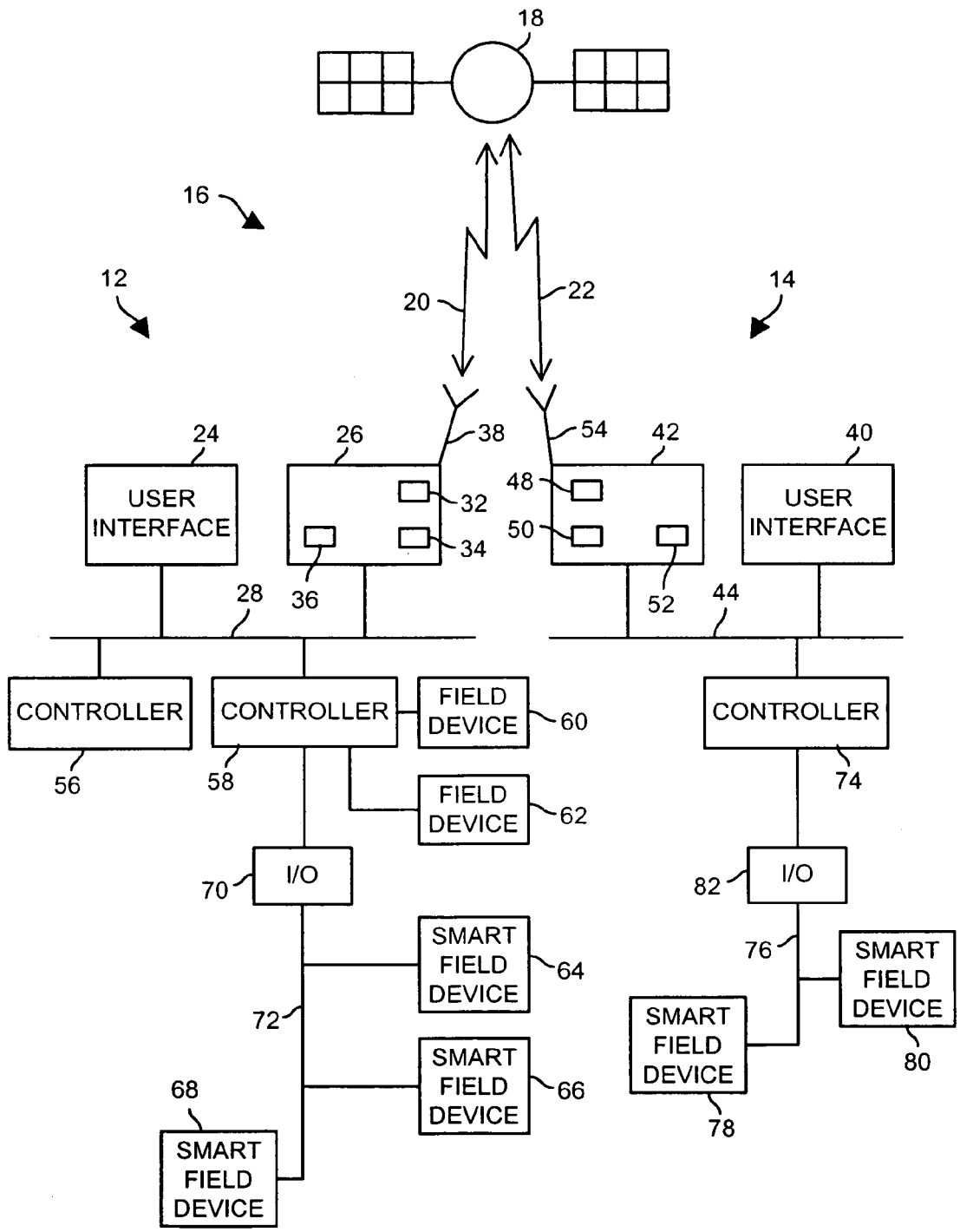
FIG. 1 is an exemplary block diagram of a process control network having a server that uses a plurality of uniquely configurable communication connections to multiplex process control data through a communication link.

While the multiplexed data transmission technique described herein is described in detail in conjunction with a satellite communication link having a large delay bandwidth product and/or a high bit error rate, the multiplexed data transmission technique can be advantageously used within a variety of communication systems, including, for example, low bandwidth systems that use modems, wireless cellular, wide area networks such as the Internet, etc. Furthermore, while described as being used in a process control system, the multiplexed data transmission technique described herein can be advantageously used in any other communication system that transmits data over any communication link having a large delay bandwidth product and/or a high bit error rate, or any other communication link.

Before discussing the multiplexed data transmission technique in greater detail, it is important to recognize that current multi-connection communication techniques are typically implemented so that the data sources or applications supplying data for transmission through a communication link send data directly to the underlying layer at an uncontrolled rate without regard for the type of data (e.g., alarm data, measurement data, etc.) that is sent. In other words, with these current multi-connection communication techniques, there is no interposing process that controls the manner in which data is conveyed from a data source such as, for example, a process control application, to the underlying layer. Further, these known multi-connection communication techniques typically allow each of the communication connections to operate independently and asynchronously with respect to the other connections and the data sources. Still further, with these multi-connection communication techniques, all of the communication connections are typically configured identically using connection parameter values associated with optimizing the throughput of a single communication connection, without consideration for the available bandwidth of the link, the buffer/stack limitations of the underlying layer, the throughput of the link as a whole and without consideration for the data transfer delays through the link.

Because the above-noted multi-connection communication techniques do not orchestrate, or control in any way, the manner in which data from one or more data sources or applications is delivered to the underlying layer of the communication connections, the throughput and the data transfer delays of the communication link may be far from optimal. For example, because the communication connections may all simultaneously attempt to deliver messages to the underlying layer for transmission through the communication link, the buffers, stacks, queues, etc. associated with the underlying layer (e.g., a transfer layer, data link layer, etc.) may become overloaded and data may be lost or corrupted, which results in retransmissions that reduce overall throughput of the link and increase the average data transfer delay.

The multiplexed data transmission technique described herein enables the efficient transmission of data through a communication link having a large delay bandwidth product and/or a high bit error rate or, in general, any communication link that conveys data packets. Generally speaking, the multiplexed data transmission technique described herein improves the throughput of a multi-connection communication link and reduces the average data transfer delay by interposing an orchestration mechanism between the data sources and the underlying layer associated with the communication connections (i.e., communication paths between a sender and a receiver). The orchestration mechanism uses a set of adjustable configuration parameters, which may be independently adjusted on a per connection basis, to control the flow of data from the data sources to each of the communication connections and the portion of the communication link bandwidth used by each of the communication connections, thereby reducing or completely eliminating competition between connections and buffer or stack overflows within the underlying layer that result in transmission errors, retransmissions, etc., which increases communication link throughput and reduces data transfer delays through the link.

FIG. 1 is an exemplary schematic block diagram illustrating a local system 12 that communicates with a remote system 14 via a communication link 16 having a high delay bandwidth product using a multiplexed data transmission technique, which is described in greater detail below. By way of example, the communication link 16 is a wireless link that uses a satellite relay 18 and communication channels 20 and 22 to establish communications between the systems 12 and 14.

The local system 12 includes a local user interface 24, which may be a workstation or any other type of computer or processor, that is connected in a communication network to a sending communication gateway 26 via a system level databus 28. The sending communication gateway 26 may be a workstation having a processor 32 that executes one or more software routines 34 stored on a memory 36 to perform the multiplexed data transmission technique described herein. The system level databus 28 may be an Ethernet databus or any other databus suitable for the transmission of data. The sending communication gateway 26 is coupled to an antenna 38 that enables communications through the communication channel 20. Similarly, the remote system 14 includes a remote user interface 40 that is connected to a receiving communication gateway 42 via a remote system level databus 44. As with the sending communication gateway 26, the receiving communication gateway 42 may be a workstation having a processor 48 that executes one or more software routines 50, which are stored on a memory 52 to perform the multiplexed data transmission technique described herein. The receiving communication gateway 42 is also coupled to an antenna 54 that enables communications though the communication channel 22.

First and second controllers 56 and 58 are illustrated as being in communication with the user interface 24 and the sending communication gateway 26 via the system level databus 28. Of course, other devices such as data storage devices, additional user interfaces, other controllers etc. (not shown) may also be connected to the system level databus 28. By way of example, the second controller 58 may be a distributed control system (DCS) type controller and may communicate with the user interface 24 using either an open or a proprietary communication protocol, or using any other protocol, via the system level databus 28. The second controller 58 may, for example, send alarm and status information to the user interface 24 and may additionally receive user commands/requests from the user interface 24 via the system level databus 28. The second controller 58 may further include control algorithms for use in controlling field devices 60 and 62 that are connected to the controller 58 in any conventional or any other desired manner. The second controller 58 is illustrated as being in communication with smart field devices 64-68 via an Input/Output (I/O) device 70. The smart field devices 64-68 are connected in a communication network using a non-proprietary protocol databus 72 and communicate with one another and the I/O device 70 to execute one or more process control loops either in conjunction with, or independently from, the controller 58. The smart field devices 64-68 may be, for example, fieldbus devices, in which case the non-proprietary protocol databus 72 employs the fieldbus signal protocol. However, other types of devices and protocols such as the HART®, PROFIBUS®, WORLDFIP®, Device-Net®, CAN, and AS-Interface protocols could be used as well. Similarly, the remote system 14 includes a controller 74 that is communicatively coupled to the remote databus 44. The controller 74 of the remote system 14 may be connected via a data bus 76 to field devices and/or to smart field devices 78 and 80 via an I/O device 82, if desired.

As is generally known, because of the orbital distance of the satellite 18, the round trip transmission time delay through the communication channels 20 and 22 (i.e., the communication link 16) may be approximately several hundred milliseconds. With conventional connection-oriented communication techniques, such as TCP-based communication techniques, the communication link 16 is idle during the round trip transmission delay because data within each window that is sent into the link 16 by the sender must be acknowledged by the receiver before the sender sends any subsequent data (i.e., reopens the window). Because an idle time of several hundred milliseconds is typically substantially greater than the time required to transmit a full window of data (which may be tens of milliseconds), the temporal efficiency and the data throughput of the above-noted connection-oriented communication techniques is very low and the cost per unit of data transmitted over the link is relatively high.

With the multiplexed data transmission technique described herein, an orchestration mechanism within the sending communication gateway 26 intelligently transfers process control data, which may contain alarm information, measured values, control status, etc., to an underlying layer of a plurality of communication connections so that the overall throughput of the communication link 16 is increased and so that the average data transfer delay is reduced. More specifically, the orchestration mechanism within the sending communication gateway 26 controls the types and sizes of (i.e., the number of bytes within) messages which are delivered to the underlying layer of the communication connections, the size of the transport layer sending buffers associated with each of the communication connections and the rate at which messages are delivered to the transport layer for transmission through the communication link 16. As a result, the multiplexed data transmission technique described herein enables a sending application, which may, for example, reside within the sending communication gateway 26, to reduce data transfer delays and idle time of the communication link 16, thereby improving utilization of the communication link 16.

FIG. 2 is an exemplary schematic block diagram that depicts one manner in which the sending communication gateway 26 of FIG. 1 may be configured to multiplex process control data through a plurality of communication connections within the communication link 16. The multiplexed data transmission technique illustrated in FIG. 2 is an object-based implementation of the communication technique described herein. By way of example only, the implementation illustrated in FIG. 2 may be based on the distributive component object model (DCOM) protocol, which is a well known object-based connection-oriented communication standard. The detailed operations of DCOM are well known and, accordingly, additional description of the DCOM infrastructure and of how DCOM operates are not provided herein. Furthermore, as is also well known in the art, objects (such as the objects discussed below in connection with FIGS. 2 and 3) are software abstractions that represent collections of methods or processes (i.e., software routines) which are encapsulated along with data that is needed to carry out the methods of the objects. Such object-oriented software programming techniques are well known in the art and, therefore, will not be described in greater detail herein.

With the multiplexed data transmission technique shown in FIG. 2, the sending communication gateway 26 includes an application object 100, a data transmission object 102 and a plurality of worker objects 104-108. The application object 100 receives process control data via the system level databus 28 from the user interface 24 (FIG. 1), the controllers 56 and 58, or generally any other device or data source that is communicatively coupled to the sending communication gateway 26 via the system level databus 28. The process control data typically includes process control information such as measured values, alarms, etc. obtained using one or more of the field devices 60-68 and the controllers 56 and 58, user inputs/commands from the user interface 24, etc.

The application object 100 marshals process control data to the data transmission object 102 by calling a method on the data transmission object 102. In turn, the data transmission object 102 buffers the process control data and marshals or distributes the buffered process control data to the worker objects 104-108 based on the availability of the worker objects 104-108, the type of data (i.e., alarm data, measurement data, etc.) contained within the buffered data and the configuration parameter values associated with each of the worker objects 104-108. For example, the data transmission object 102 may transfer data representing alarm information to one of the worker objects 104-108 and may send data representing measurement information to another one of the worker objects 104-108.

Additionally, the data transmission object 102 may partition the buffered process control data before distributing the data to the worker objects 104-108. By way of example only, the application object 100 may send various types of data to the data transmission object 102 and the data transmission object 102 may partition the application object data into multiple data streams or queues so that each data stream or queue contains a particular type or category of data. The data transmission object 102 may then assign each of the data streams or queues to a particular one of the worker objects 104-108 (based on the configuration parameters associated with each of the worker objects 104-108) for transmission through the communication link 16. For example, if the worker object 104 is configured to carry alarm data, then the data transmission object 102 may assign a data stream or queue containing alarm data to that worker object. Similarly, if the worker object 106 is configured to carry measurement data, then the data transmission object 102 may assign a data stream or queue containing measurement data to that worker object. In this manner, a one-to-one correspondence between the data streams or queues within the data transmission object 102 may be established with the worker objects 104-108. However, a one-to-one correspondence between the data streams or queues within the data transmission object 102 and the worker objects 104-108 does not have to be established. For example, in applications where sequencing of the application data is not required, the data transmission object 102 may assign individual data streams or queues to more than one worker object.

As each of the worker objects 104-108 becomes available (e.g., indicates to the data transmission object 102 that data may be transferred to the worker object), the data transmission object 102 transfers data from the various data streams or queues to appropriate ones of the worker objects 104-108. In turn, the worker objects 104-108 may fragment the discrete blocks of data received from the data transmission object 102 to form multiple system messages based on the configuration parameters associated with the worker objects 104-108. For example, if the data transmission object 102 assigns a data stream or queue containing alarm data in discrete blocks of 4096 bytes to the worker object 104 (which is configured to send alarm data and has a configuration that specifies a maximum system message size of 1024 bytes), the worker object 104 fragments each 4096 byte block received from the data transmission object 102 to form four 1024 byte system messages and delivers these system messages one at a time to the underlying layer (i.e., TCP, UDP, DCOM, etc.).

In any event, the system messages associated with each of the worker objects 104-108 that are sent to the underlying layer for transmission through the communication link 16 each have a size (i.e., a number of bytes) corresponding to the message size configuration parameter of a particular communication connection. It should be recognized that while the fragmenting of data blocks into system size messages is described above as being performed by the individual worker objects 104-108, the fragmenting may, alternatively, be performed by the data transmission object 102 prior to transfer of the data to the worker objects 104-108.

The data transmission object 102 may use any of a variety of techniques, depending on the nature of the data, to buffer or queue process control data received from the application object 100 to control the manner in which the data is available to be sent to the worker objects 104-108. For example, process control data may be buffered or queued for availability in the order in which it is received from the application object 100. Alternatively, the data may be buffered or queued for availability based on the sizes of the data blocks, the types and/or content of the data blocks, etc. In these manners, the data transmission object 102 may organize the buffer or queue to prioritize data and send data to the worker objects 104-108 in a manner that maximizes the throughput of the communication link 16. Of course, a variety of other techniques may be used to buffer or queue data within the data transmission object 102. Additionally, although one application object 100 is shown in FIG. 2 as providing data to the data transmission object 102, additional application objects, threads or processes may also provide data to the data transmission object 102.

Generally speaking, each of the worker objects 104-108 has the task of marshalling data it receives from the data transmission object 102 to the receiving communication gateway 42. More specifically, each of the worker objects 104-108 establishes and configures a separate communication connection through the communication link 16 and, may be assigned by the data transmission object 102 to receive a particular type of data (e.g., alarm information, measurement values, etc.) Further, the worker objects 104-108 include timer functions 110-114, each of which may be uniquely configured to establish the rates at which the worker objects 104-108 deliver system messages to an underlying layer for transmission through the communication link 16.

Each of the worker objects 104-108 may be individually configured to have its own context within the communication processes being carried out between the sending communication gateway 26 and the receiving communication gateway 42 via the communication link 16. In particular, each of the worker objects 104-108 has several configuration parameters that are independently tunable or adjustable so that each of the worker objects 104-108 may be configured using a different set of parameter values, if desired. In particular, each of the worker objects 104-108 includes a "time between calls" parameter that causes the timer functions 110-114 within the respective worker objects 104-108 to regulate the rate at which messages are delivered to the underlying layer, which may, for example, use a connection-oriented protocol such as TCP. Further, each of the worker objects 104-108 may include a "message size" parameter that sets an upper limit on the number of data bytes contained within each message delivered by the worker objects 104-108 to the underlying layer. As noted above, the "message size" parameter may be used by either the worker objects 104-108 or the data transmission object 102 to fragment data transferred by the application object 100 to the data transmission object 102 into system messages (i.e., messages which are delivered to the underlying layer for transmission through the communication link 16) having a predetermined number of bytes. Still further, each of the worker objects 104-108 may include a "sending buffer size" parameter that specifies the number of data bytes that the communication connection associated with the worker object has for the purpose of storing messages. If the underlying transport layer is TCP-based, the sending buffer size for each communication connection may vary in size, for example, between about 128 bytes and 65,536 bytes. Of course, other or different parameters associated with a communication connection or channel may be included as well.

The underlying transport protocol associated with each of the communication connections ultimately determines, independent of the values selected for the message size parameter and the sending buffer size parameter for each of the worker objects 104-108, the maximum number of data bytes contained within each data packet that is sent into the communication link 16. For example, if a connection-oriented communication protocol such as TCP is used in the underlying transport layer, the transport layer may further fragment or combine messages delivered by the worker objects 104-108 into data packets that contain a number of bytes which is different from the number bytes contained within the system messages delivered to the underlying layer by the worker objects 104-108.

Furthermore, the data packets created by the transport layer include a protocol header having a communication connection identifier and a packet sequence number, which are well known in the art. For example, in the case where the underlying transport layer uses TCP, source and destination TCP port numbers are included within the protocol header as a connection identifier. The connection identifier uniquely identifies which one of the worker objects 104-108 sent the data packet and, thus, because a particular worker object may be sending a particular type of data (e.g., alarms, measurement values, etc.), the connection identifier also corresponds to that particular type of data.

FIG. 3 is an exemplary schematic block diagram that depicts one manner in which the receiving communication gateway 42 of FIG. 1 may be configured to receive the multiplexed data transmissions sent by the sending communication gateway 26 of FIG. 1. Similar to the sending communication gateway 26, the receiving communication gateway 42 includes a plurality of worker objects 200-204, a data reception object 206 and a receiving communication gateway application object 208. Each of the worker objects 200-204 may correspond uniquely with one of the worker objects 104-108 within the sending communication gateway 26. For example, messages that are processed and transmitted by the worker object 104 within the sending communication gateway 26 may be received and processed exclusively by the worker object 200 within the receiving communication gateway 42. In this way, corresponding pairs of worker objects may be configured so that each connection (i.e., communication path) through the communication link 16 carries a particular type of data. Further, because the time between calls parameter value, the sending buffer size parameter value, etc. can be varied on a per connection basis, the portion of the communication link bandwidth allocated to each communication connection may be varied on a per connection basis. As a result, the effective priority of the data flowing through each connection can be controlled relative to the other connections. For example, if the worker object 104 is configured to carry alarm data and the worker object 200 receives messages from the worker object 104, the communication connection associated with the worker objects 104 and 200 may be given a high relative priority by allocating a relatively small value for the time between calls parameter to that connection. A relatively large value for the message size parameter, in comparison to the values used for the other connections, may be used to control how much data is to be sent through the communication connection associated with the worker objects 104 and 200 using this priority level. However, as described in greater detail below, other combinations of configuration parameter values could be used instead to achieve a similar result.

The connection identifiers, which are TCP port numbers where the underlying transport protocol is TCP-based, are used at the receiving communication gateway 42 to route received data packets to appropriate ones of the worker objects 200-204. For example, when the worker object 104 sends a message to the underlying layer, the transport layer may fragment the message into data packets and prepend a protocol header including a connection identifier (e.g., TCP port numbers) and a sequence number to each data packet. The transport layer then forwards the data packets to underlying communication layers (e.g., a data link layer, a physical layer, etc.) that physically transmit the data packets through the communication link 16 to the receiving communication gateway 42. When the underlying connection endpoint (e.g., a TCP connection endpoint) at the receiving communication gateway 42 receives the data packets, the connection endpoint at the receiving communication gateway 42 uses the connection identifiers within the protocol headers of each packet to deliver the data in the data packets to appropriate ones of the worker objects 200-204. Additionally, the connection endpoint uses the sequence numbers within the protocol headers of the received data packets to sequence the data in the data packets to reconstitute messages. Thus, because each of the worker objects 104-108 is instantiated separately and establishes its own connection through the transport layer, the connection identifier may be used to multiplex data through the communication link 16 and to demultiplex these messages at a remote receiving station such as the receiving communication gateway 42.

The worker objects 200-204 marshal properly received messages to the data reception object 206, which internally buffers or queues the messages. The data reception object 206 then marshals the messages to the receiving communication gateway object 208 which, in turn, routes the messages to one or more devices that are communicatively coupled to the remote system level databus 44. In a manner similar to that employed by the data transmission object 102 discussed above, the receiving communication gateway application object 208 may remove messages buffered or queued within the data reception object 206 based on the order in which the messages were received, the sizes of the messages, the content of the messages, the relative importance of the messages, etc.

In operation, each of the worker objects 104-108 establishes a separate connection through the communication link 16 with the receiving communication gateway 42. The connection may be established using sets of default values for the time between calls, the message size, the sending buffer size, or any other configuration parameters that are associated with the worker objects 104-108 or, alternatively, the sets of default parameters may be overridden (i.e., modified) via user inputs at runtime. For example, to establish a connection, each of the worker objects 104-108 creates a socket, sets the buffer size for the connection using the buffer size parameter value and opens the connection with the receiving communication gateway 42. Practically speaking, the buffer size may be set either before or after a connection is opened and may be modified during data transfer for tuning purposes. After the connections have been opened, each of the worker objects 104-108 informs the data transmission object 102 of the maximum message size for the worker object and the type of data that the worker object sends through the communication link 16.

Figure 4A:
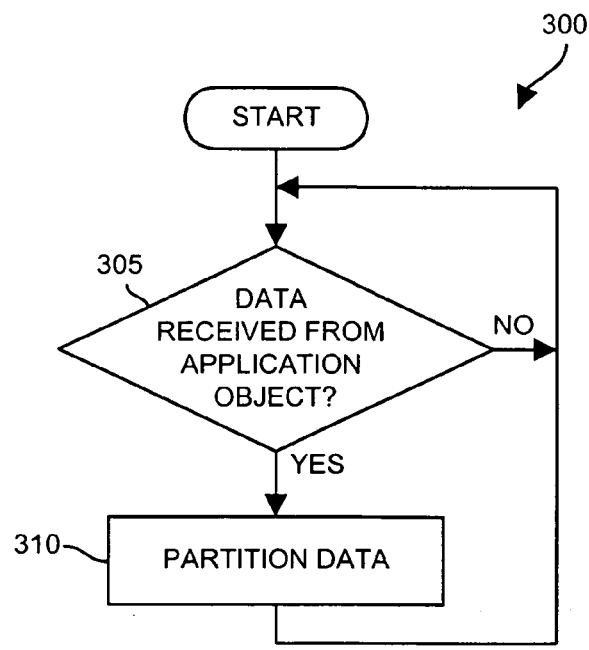
FIG. 4A is an exemplary flow diagram depicting one method by which the data transmission object of FIG. 2 may process data received from the application object shown in FIG. 2.
Figure 4B:
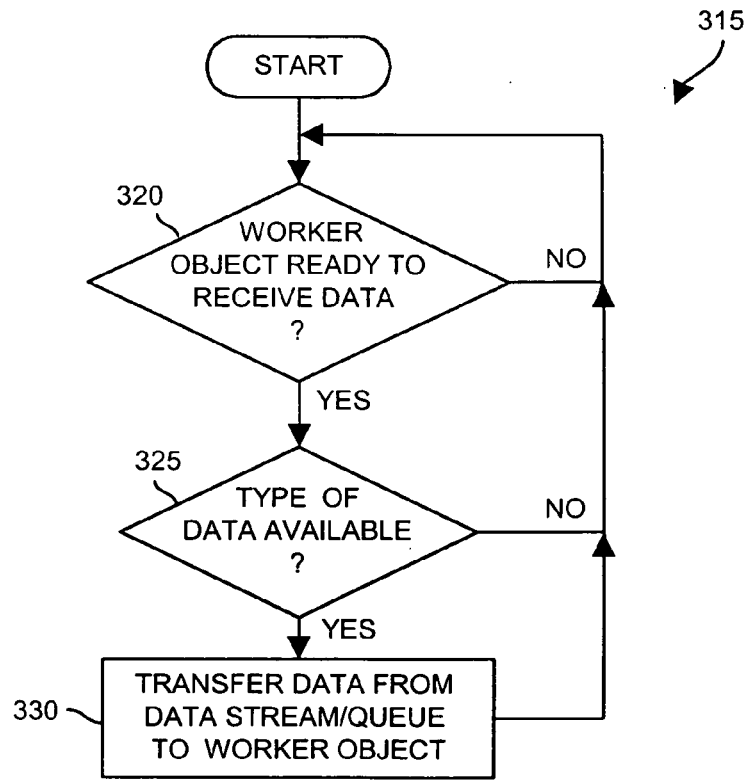
FIG. 4B is an exemplary flow diagram depicting one method by which the data transmission object of FIG. 2 may transfer data to the worker objects shown in FIG. 2.
Figure 4C:
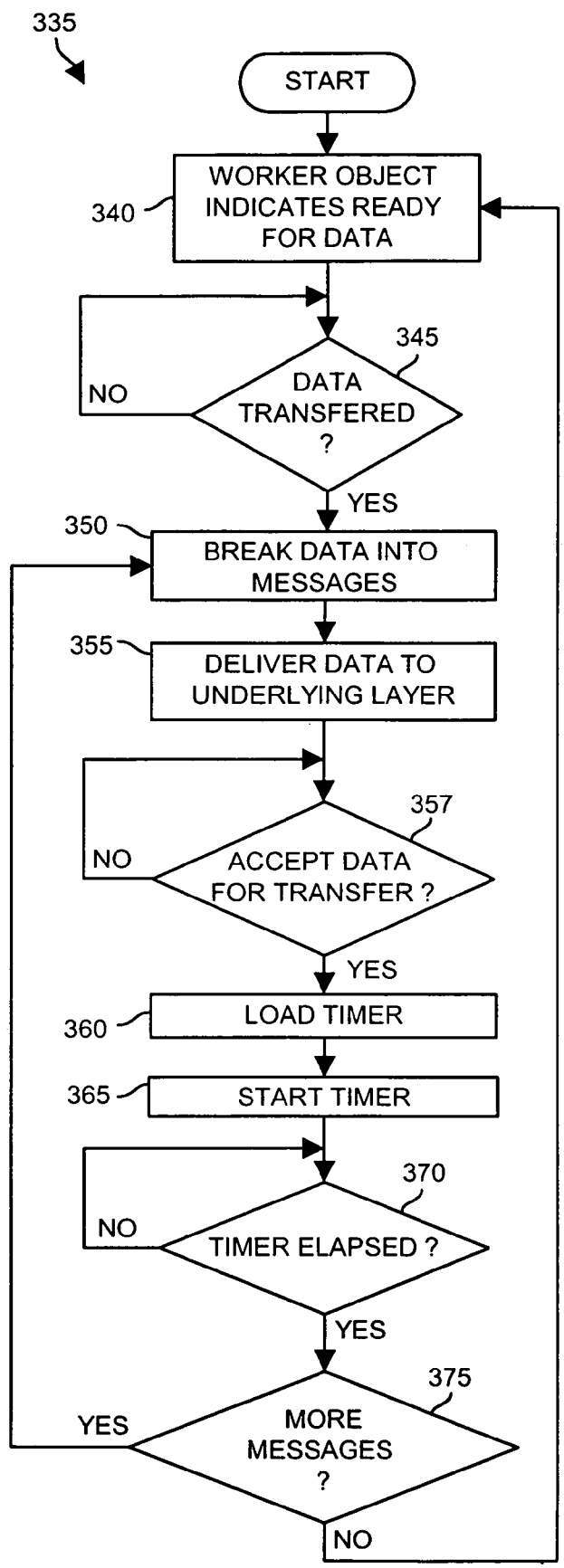
FIG. 4C is an exemplary flow diagram depicting one method by which each of the worker objects of FIG. 2 may deliver data to an underlying layer of a communication link.

FIGS. 4A-4C are exemplary flow diagrams depicting one manner in which the data transmission object 102 and the worker objects 104-108 and 200-204 of FIGS. 2 and 3 may cooperate to multiplex data through a plurality of communication connections within the communication link 16. In particular, FIG. 4A is an exemplary flow diagram depicting one method 300 by which the data transmission object 102 may process data received from the application object 100. Block 305 determines whether any data is being sent by the application object 100 to the data transmission object 102. If no data is being sent, then the method 300 reenters block 305. On the other hand, if data is being sent by the application object 100, then block 310 partitions the data into a plurality of data streams or queues based on, for example, the type of information the data represents. For instance, alarm data may be partitioned into one data stream or queue, measurement data may be partitioned into another data stream or queue, etc. Preferably, but not necessarily, the data transmission object 102 maintains one data stream or queue for each of the worker objects 104-108. In other words, there may be a one-to-one correspondence between the worker objects 104-108 and the data streams or queues maintained within the data transmission object 102. Additionally, each of the data stream (or queue) and worker object pairs may be configured to convey a particular type of data. For example, the data transmission object 102 may maintain a data stream or queue that conveys only alarm data to the worker object 104, which may be configured to convey only alarm data through the communication link 16. Further, the data transmission object 102 may maintain another data stream or queue that conveys only measurement data to the worker object 106, which is configured to convey only measurement data through the communication link 16. After block 310 has partitioned the data received from the application object 100, the method 300 reenters block 305.

FIG. 4B is an exemplary flow diagram depicting one method 315 by which the data transmission object 102 may transfer data from its internal data streams or queues to the worker objects 104-108. Block 320 determines whether one of the worker objects 104-108 is ready to receive data. If none of the worker objects 104-108 is ready, then the method 315 reenters block 320. On the other hand, if a worker object is ready, block 325 determines whether the data stream or queue associated with the ready (i.e., available) worker object contains any data. If the associated data stream or queue does not contain any data, the method 315 reenters block 320. On the other hand, if the method 315 determines that the associated data stream or queue contains data, block 330 transfers data from the associated data stream or queue to the ready worker object and the method 315 reenters block 320.

FIG. 4C is an exemplary flow diagram depicting one method 335 by which each of the worker objects 104-108 may receive data from the data transmission object 102 and deliver data to the underlying layer within the communication link 16. Block 340 indicates to the data transmission object 102 that the worker object is ready for data. A worker object may indicate that it is ready for data by sending a request for data to the data transmission object 102. Alternatively, the worker object may remain idle when more data is needed and the data transmission object 102 may recognize the idle condition as an indication that the worker object is ready to receive data. Preferably, but not necessarily, block 340 requests a particular type of data (e.g., alarm data, measurement data, etc.) based on the configuration of the requesting worker object and then the method 335 enters block 345. As discussed above, each of the worker objects 104-108 may be uniquely associated with one of a plurality of communication connections through the communication link 16 and each communication connection may be configured to carry a particular type of data and to deliver messages having a maximum number of bytes at a predetermined rate to the underlying layer. Block 345 determines if the data transmission object 102 has transferred data to the worker object. If the data transmission object 102 has not transferred the data, then the method 335 reenters block 345. On the other hand, if the data transmission object 102 has transferred the data, then block 350 fragments the transferred data into system messages having a number of bytes that is based on the message size parameter of the worker object. For example, if the transferred data arrives in 4096 byte blocks and if the worker object has a message size parameter that specifies a maximum system message size of 1024 bytes, the worker object fragments each of the 4096 byte blocks into four 1024 byte system messages. Block 355 delivers one system message at a time to the underlying layer for transmission through the communication link 16. As is well known, the underlying layer packetizes (i.e., forms data packets using) the system messages. Additionally, each data packet includes a protocol header having a connection identifier and a packet sequence number that may be used by the receiving communication gateway 42 to demultiplex received packets and to reconstitute messages. The underlying layer sends the data packets to underlying data link and physical layers, which physically transmit the data packets into the communication link 16. Block 357 determines if the underlying layer has accepted the system message for transfer and, if the message has not been accepted, the method reenters block 357. On the other hand, if the message has been accepted for transfer, the method enters block 360.

Block 360 loads a timer with a value based on the time between calls parameter of the worker object and block 365 starts the timer. Block 370, determines if the timer has elapsed and, if the timer has not elapsed, the method 335 reenters block 370. On the other hand, if the timer has elapsed, then block 375 determines if there are more messages to send. If there are more messages to send, then the method 335 reenters block 355. On the other hand, if there are no more messages to send, then the method 335 renters block 340.

As can be seen from the above-described operation of the data transmission object 102 and the worker objects 104-108 and 200-204, the parameters for each of the communication connections associated with the worker objects 104-108 and 200-204 may be adjusted or tuned to control and coordinate the manner in which messages are delivered to the underlying layer by each of the worker objects 104-108. In other words, the configuration parameters associated with the communication connections may be individually set to achieve a harmonious multiplexing operation that reduces or completely eliminates competition between connections to improve the throughput and to reduce the average data transfer delay of the communication link 16. Thus, each of the worker objects 104-108 that delivers data to the underlying layer of the communication link 16 may be configured to process messages of a particular size that contain a particular type of data. Further each of the worker objects 104-108 may be configured to deliver messages to the underlying layer at a particular rate and each communication connection may be configured to have a different sending buffer size which, as is well known in the art, affects the size of the maximum transmission unit and the rate at which the underlying layer sends packets into the communication link 16.

Although any number of worker objects may be used to carry out the communication scheme shown in FIGS. 2-4, the packet size used by the transport layer, the round trip transmission time of the communication link, and other factors will determine the minimum number of worker objects needed to temporally pack (i.e., minimize the idle time and increase the throughput of) the communication link 16. Generally speaking, if a connection-oriented communication protocol is used within the transport layer, the number of worker objects needed to temporally pack the communication link 16 is set so that the time required to transmit a window of data bytes into the link 16 multiplied by the number of worker objects is greater than the round trip transmission time delay of the communication link 16. For example, if it takes 20 milliseconds to send a full window of data bytes into the link 16 and the round trip transmission time of the communication link 16 is 300 milliseconds, then approximately 15 worker objects may be needed to temporally pack the communication link 16. Of course, more or fewer worker objects may used, if desired. In fact, the data transmission object 102 may create additional worker objects as they are needed, based on the volume of traffic (i.e., the amount of data which is sent) through the communication link 16. Thus, as message traffic increases, the data transmission object 102 may create additional worker objects to temporally pack the communication link 16. Likewise, the data transmission object 102 may eliminate worker objects as the volume of message traffic decreases.

System designers can implement the communication technique described herein using any receiving communication gateway or client, which may be made by any manufacturer. In fact, the sending communication gateway configuration shown in FIG. 2 extorts the functionality of a compatible receiving communication gateway to establish multi-connection communications so that the receiving communication gateway 42 does not have to know ahead of time that the sending communication gateway 26 will be using multiple connections to multiplex data through the communication link 16. Still further, while the sending communication gateway 26 is described as instantiating the connections, the system may alternatively be configured so that the connections are instead instantiated by the receiving communication gateway 42.

While the object-based connection-oriented communication technique described above in connection with FIGS. 2-4 is described as employing TCP within the transport layer, it should be understood that other object-based communication protocols at a higher layer such as DCOM, CORBA, JAVA, BEANS, SOAP, etc. may be used instead.

The multiplexed data transmission technique described herein in connection with FIGS. 1-4 may, in general, be advantageously applied to any communication link to increase the throughput and decrease average data transfer delay of the link, particularly communication links, such as satellite communication links, that have a large delay bandwidth product and/or a high bit error rate. Further, because the communication technique described herein enables each of a plurality of communication connections to be configured using a different set of parameter values for message size, sending buffer size, time between calls, etc., if desired, the overall flow of data through the communication link can be orchestrated to increase the throughput and decrease the average data transfer delay of the link. Still further, the communication technique described herein may be used (by making appropriate adjustments to the communication connection configuration parameters) to optimize the throughput and decrease the average data transfer delay of a communication link despite the fact that the characteristics of the link (e.g., the bit error rate, the round trip transmission time delay, etc.) may vary over time due to changing environmental conditions, hardware conditions, etc. In any event, the manner in which the communication technique disclosed herein orchestrates the flow of data through a plurality of communication connections can be adjusted or tuned by varying one or more of the communication connection configuration parameters of one or more of the worker objects 104-108, which enables the communication technique disclosed herein to increase the throughput of a wide variety of communication links having a wide variety of transmission characteristics.

Figures 5, 6:
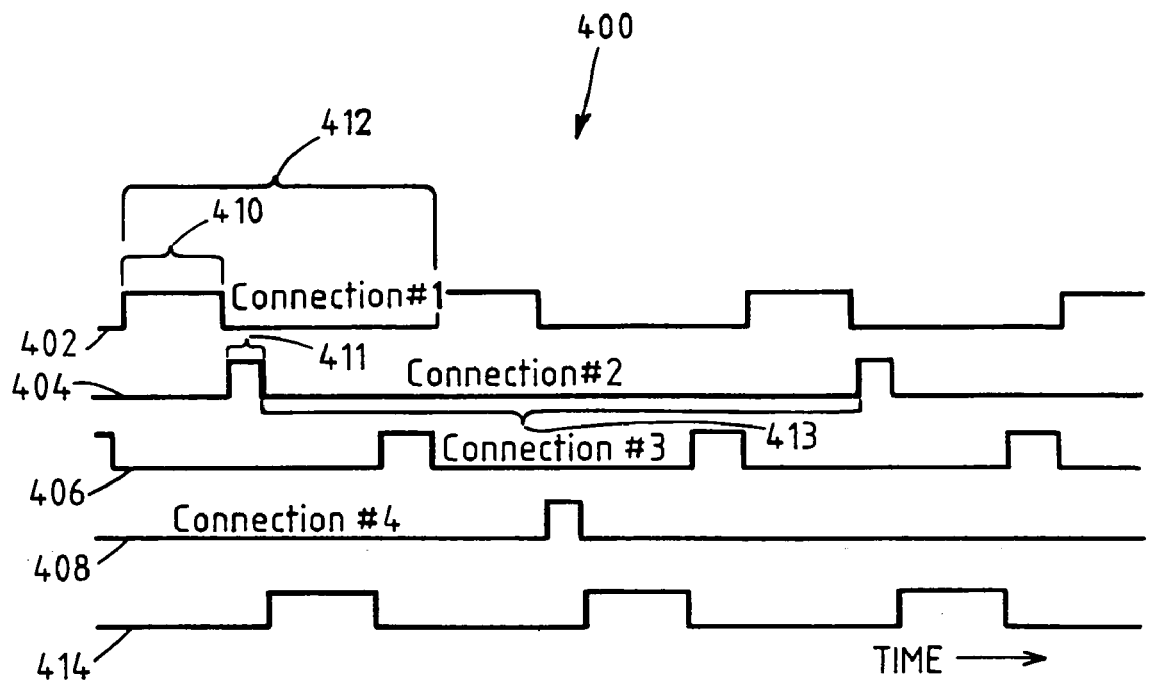
FIG. 5 is an exemplary timing diagram that graphically depicts one manner in which the communication connections shown in FIGS. 2 and 3 may be uniquely configured to achieve a harmonious multiplexing of data through a communication link.
FIG. 6 is a table that depicts one manner in which the communication connections of FIGS. 2 and 3 may be uniquely configured to achieve the harmonious data multiplexing operation shown in FIG. 5.

FIG. 5 is an exemplary timing diagram 400 that depicts one manner in which the communication connections shown in FIGS. 2 and 3 may be uniquely configured to multiplex process control data through a communication link. By way of example only, the timing diagram 400 graphically depicts the manner in which first through fourth communication connections 402-408 cooperate to transmit data through the communication link 16 efficiently. In particular, the transmissions of the communication connections 402-408 are temporally interleaved to maintain an optimal balance of idle time and data transfer delays within the communication link 16. For example, the first communication connection 402 is configured with message size and time between calls parameter values that result in a message transmission time during a first time interval 410 and a second time interval 412 between message transmissions, and the second communication connection 404 is configured with message size and time between calls parameter values that result in a message transmission time during a third interval 411 and a fourth time interval between message transmissions. As is well known, message transmission time may be calculated by multiplying the bit transmission rate of the communication link 16 by the number of bits within a message which, in this case, is controlled by the message size parameter.

As can be seen from FIG. 5, the communication connections 402-408 may be uniquely configured with a message size parameter value (i.e., a message transmission time) and a time between calls parameter value (i.e., a repetition rate or frequency) so that the connections 402-408 do not compete for use of the communication link 16. In other words, the message transmission times and message transmission rates are selected so that the use of the communication link 16 by the connections 402-408 is temporally interleaved (i.e., only one connection attempts to transmit data through the communication link 16 at a given time). Further, the message size and time between calls parameter values may be selected so that a portion of the total available bandwidth of the communication link 16 is allocated to each of the communication connections 402-408. Generally speaking, as the message size parameter value increases and as the time between calls parameter value decreases for a given communication connection (with respect to all other communication connections through a link), the given communication connection consumes a relatively larger portion of the total available bandwidth of the communication link.

As is also shown in FIG. 5, the communication connections 402-408 do not consume the entire bandwidth of the communication link 16. Instead, the communication connections 402-408 are configured to reserve some idle time, which is needed to process data retransmissions and which is represented by the exemplary waveform at reference numeral 414. Without reserved idle time, data retransmissions would result in a substantial increase in data transfer delays through the communication link 16. Thus, configuring the communication connections 402-408 to provide a sufficient reserved idle time to process data retransmissions maintains data transfer delays at a minimum without significantly increasing idle time (i.e., reducing throughput) of the communication link 16. As is commonly known, data transfer delays are undesirable because for many applications, and particularly for process control applications, large transfer delays result in stale data being delivered to a receiving communication gateway. Thus, in some applications it may be desirable to sacrifice some throughput for a reduction in the average data transfer delay.

FIG. 6 is a table that depicts by way of example only, configuration parameter values that may be used to configure the communication connections 402-408 to achieve the harmonious data multiplexing operation shown in FIG. 5. As can been seen in the table, each of the connections 402-408 includes a message size value in bytes and the inverse of the time between calls parameter value, which is a frequency in Hertz. The bandwidth allocation of each connection may be calculated by multiplying the message size for the connection by the inverse of the time between calls for the connection. Practically speaking, to prevent competition between the connections 402-408, the sum of the bandwidth allocations for each of the channels 402-408 plus the bandwidth allocated to the reserve for retransmissions must be less than or equal to the total available bandwidth of the communication link 16. Additionally, it should be recognized that the relative priority of a communication connection is directly related to the bandwidth that has been allocated to that connection. Thus, as shown in FIGS. 5 and 6, the first connection 402 has the highest relative priority because it has the largest bandwidth allocation (i.e., 20.8 kilobits per sec (kb/s)). Of course, relative priorities and, thus, bandwidth allocations may be made based on the type of data that is carried by each of the connections 402-408. For example, the first connection 402 may carry only alarm data and, as a result, the relatively large bandwidth allocation to the first connection 402 enables a large amount of alarm information to be quickly conveyed through the communication link 16. In contrast, the second connection 404 may carry only non-critical measurement data and, thus, the bandwidth allocation of 4.8 kb/s allows only a limited amount of such data to be sent through the communication link 16 in a given time period in comparison to alarm data. Further, the bandwidth needed for the reserve (i.e., retransmissions) may be determined using the bit error rate of the link. In any event, bandwidth allocations may be made on a connection by connection basis (via the uniquely configurable communication connection configuration parameters) to optimally utilize the total available bandwidth of the communication link 16 as desired.

By way of example only, the configuration of a plurality of communication connections using the techniques described herein to achieve a harmonious multiplexing of data through a communication link for a particular process control system, or any other system depends, at least in part, to a large extent on constraints imposed by the system designer or by physical limitations within the system itself. For example, in cases where the communication link provides more bandwidth than is needed to transmit the data generated by a local system to a remote system, the system designer may allocate bandwidth to each type of data based on the amount of each type of data that is generated by the local system. Thus, if the local system generates an amount of alarm data that can be transmitted through the link using a bandwidth allocation of 20.8 kb/s, then the system designer configures the message size and time between messages parameters for the communication connection carrying alarm data so that the bandwidth allocated to that connection is greater than or equal to 20.8 kb/s. Of course, because numerous message size and time between message parameter values may yield a desired bandwidth allocation, the system designer must select one of these parameter values and then calculate the other using the desired bandwidth allocation. For example, the system designer may select a message size that provides a desired balance between throughput and data transfer delay (see discussion below in connection with FIGS. 7-10) and calculate the time between messages parameter value that yields the desired bandwidth allocation. In a similar manner, the system designer can allocate bandwidth to the remaining types of data types by appropriately configuring the parameters associated with each of the remaining communication connections, which may each carry a particular type of data.

FIGS. 7-10 described in greater detail below generally illustrate the relative relationships between the communication connection configuration parameters and the throughput of a communication link. However, the specific set of configuration parameter values that provides an optimal throughput for a given link depends on the characteristics of the link which, in some cases, may be changing over time.

Figure 7:
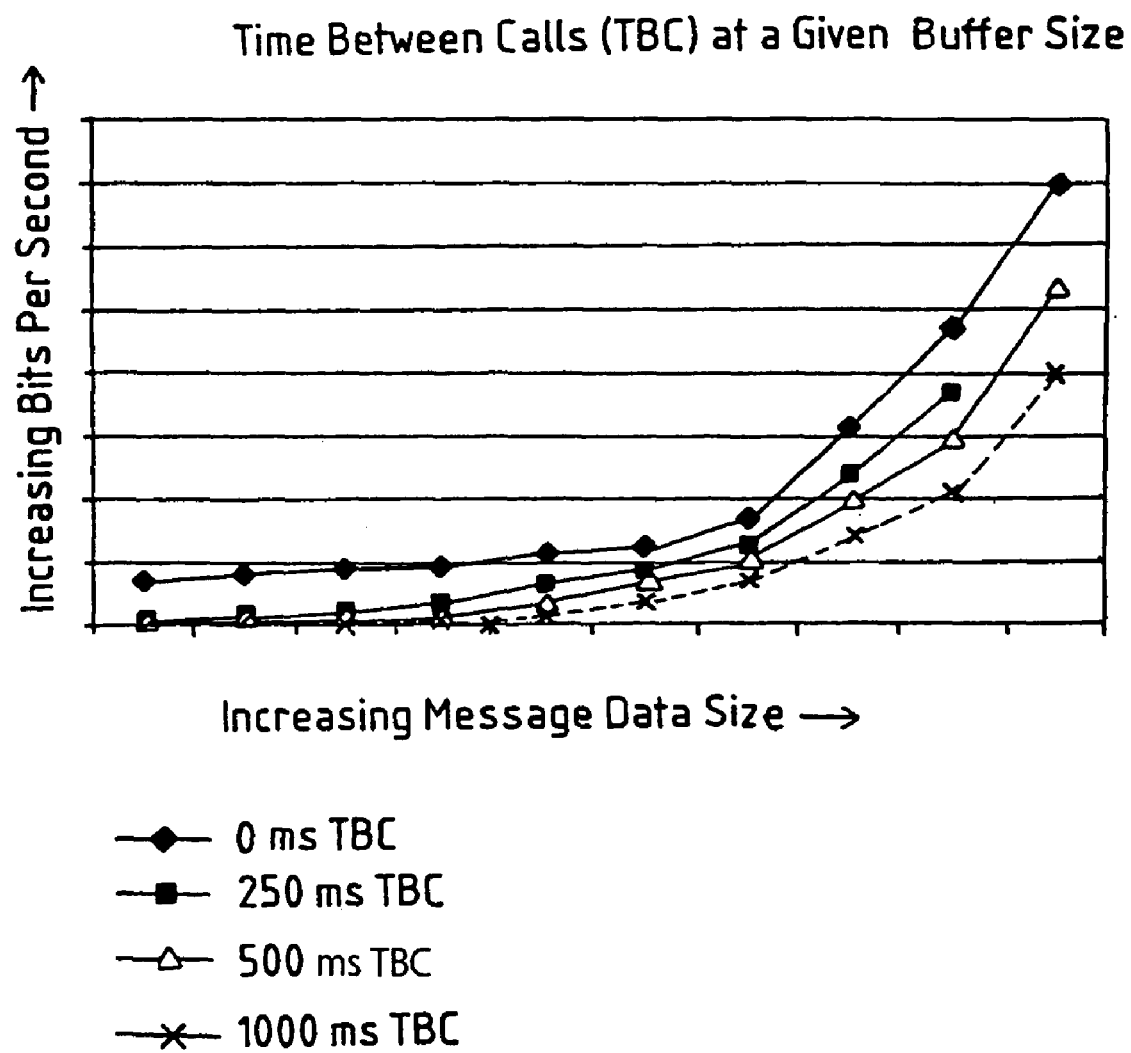
FIG. 7 is an exemplary graphical representation of the relative relationships between message size, time between calls and throughput of a communication link.

FIG. 7 is an exemplary graphical representation of the relative relationships between message size, time between calls and throughput of a communication link for a given buffer size. As shown in FIG. 7, the communication link throughput increases as message size increases and as the time between calls (indicated as "TBC" in the legend) decreases.

Figure 8:
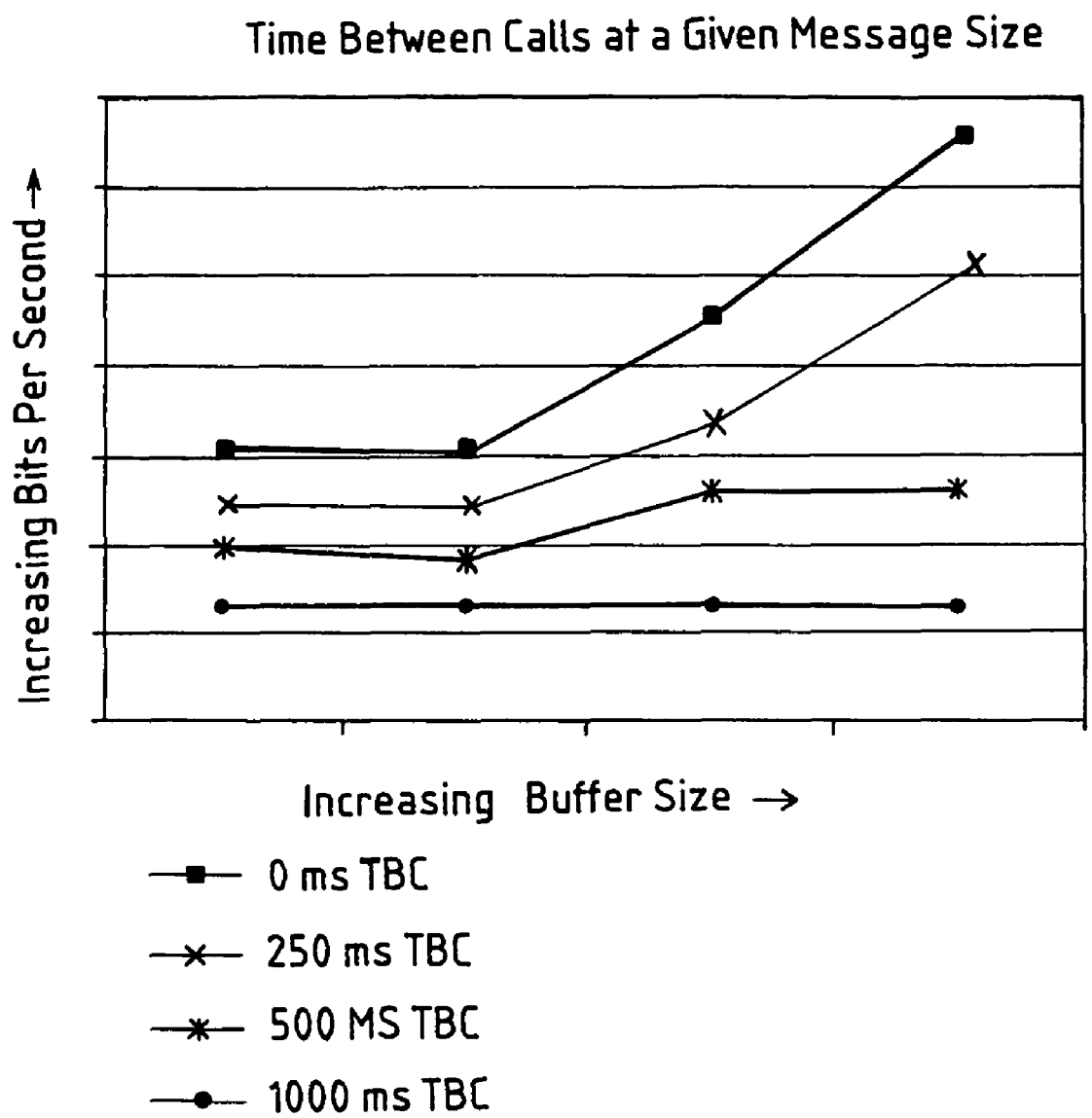
FIG. 8 is an exemplary graphical representation of the relative relationships between buffer size, time between calls and throughput of a communication link.

FIG. 8 is an exemplary graphical representation of the relative relationships between buffer size, time between calls and throughput of a communication link for a given message size. As shown in FIG. 8, the communication link throughput increases as buffer size increases and as the time between calls decreases. Additionally, FIG. 8 shows that communication link throughput becomes more sensitive to the buffer size as the time between calls decreases.

Figure 9:
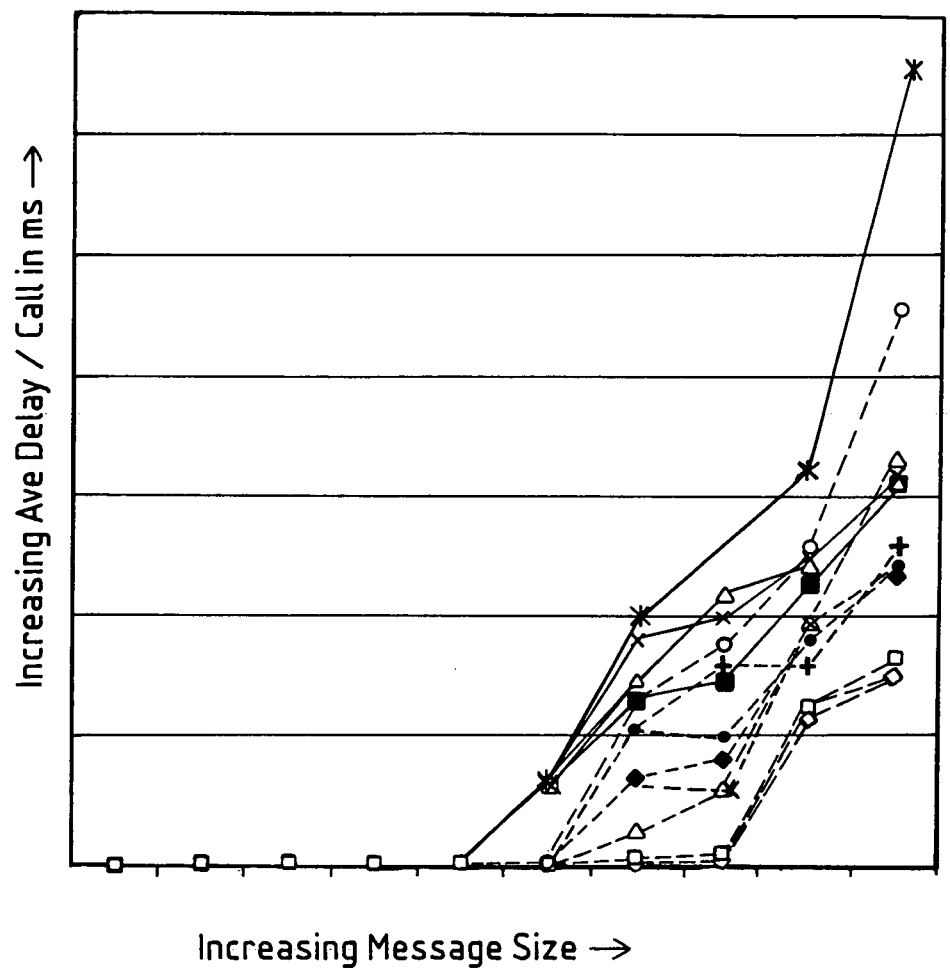
FIG. 9 is an exemplary graphical representation of the relative relationships between message size, time between calls, bit error rate and message delivery delay of a communication link.

FIG. 9 is an exemplary graphical representation of the relative relationships between message size, time between calls, bit error rate and message delivery delay of a communication link for a given buffer size. As shown in FIG. 9, the average message transmission delay increases as the message size increases and as the time between calls decreases. Additionally, FIG. 9 shows that the average message transmission delay increases as the bit error rate (indicated as "BER" in the legend) increases.

Figure 10:
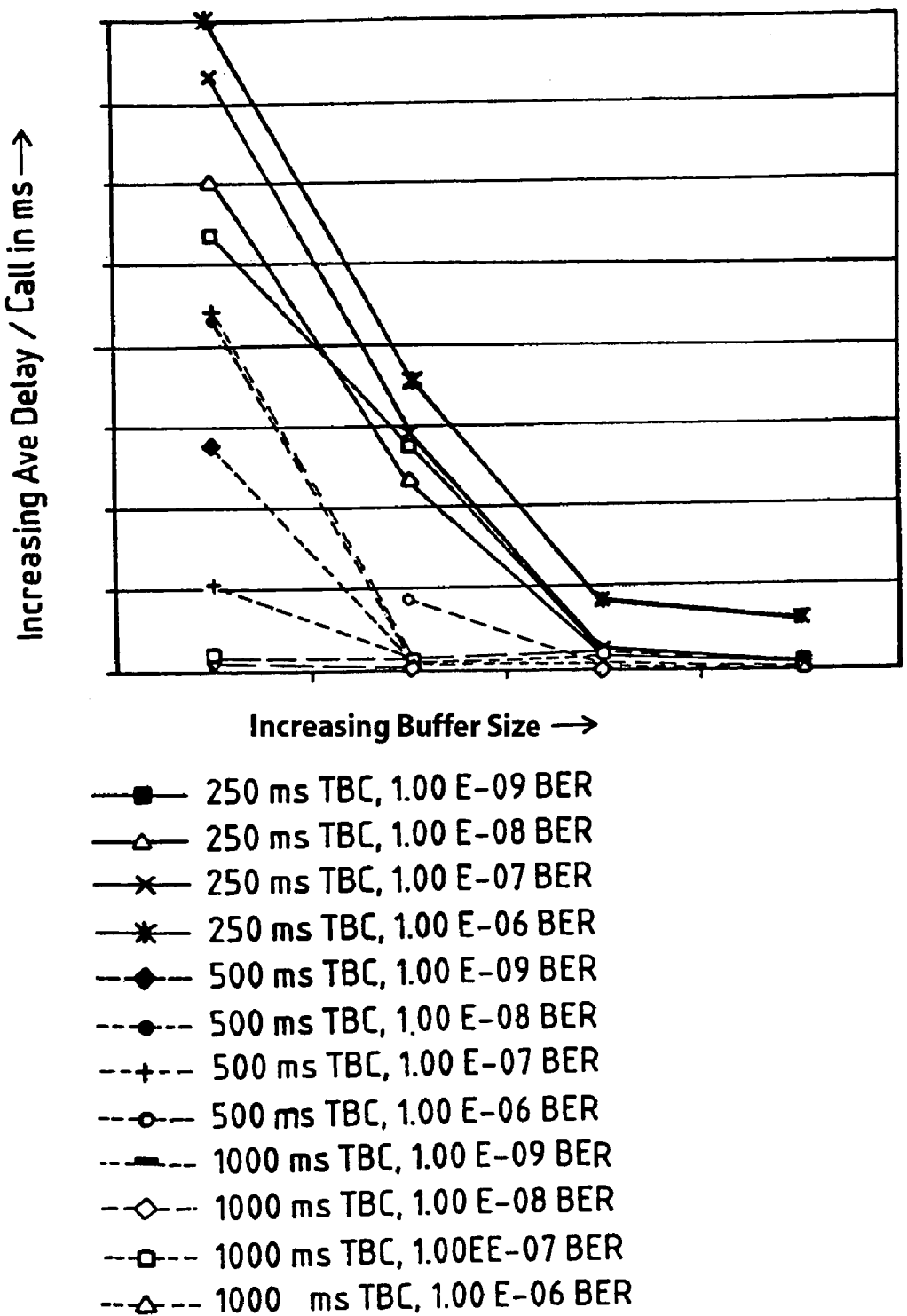
FIG. 10 is an exemplary graphical representation of the relative relationships between buffer size, time between calls, bit error rate and delivery delay of a communication link.

FIG. 10 is an exemplary graphical representation of the relative relationships between buffer size, time between calls, bit error rate and delivery delay of a communication link for a given message size. As shown in FIG. 10, the average message transmission delay decreases as the buffer size increases and as the time between calls increases.

The graphs described above in connection with FIGS. 7-10 may be generated using empirical test methods. For example, a communication connection may be opened through a communication link to be characterized and a test message may repeatedly sent through the link (e.g., by using a looping operation). Each time the test message is sent into the communication link 16, one or more of the communication connection configuration parameters may be varied while monitoring communication link throughput and data transfer delay. In this manner, the relationships between the communication configuration parameters and communication link performance (i.e., throughput and data transfer delay) may be developed.

The above-described communication technique enables an efficient transmission of data through a communication link having a large delay bandwidth product and/or a high bit error rate. Generally speaking, the communication technique described herein increases the throughput and reduces the average data transfer delay of the communication link 16 by orchestrating the flow of data through a plurality of communication connections. As described above, the communication technique described herein can be used within a process control system to enable efficient (i.e., high throughput and low cost per unit of data sent) communications between a local portion and a remote portion of a control system that communicate via a communication link.

Generally, the above-described communication technique may be efficiently implemented using a general purpose processor to execute a number of software code segments or modules that are retrieved from a computer readable memory. For instance, the application object 100, the data transmission object 102, the data reception object 206, and the worker objects 104-108 and 200-204 illustrated in FIGS. 2-4 may each include one or more software routines, code segments etc. which are stored on a memory. However, other combinations of hardware and software using, for example, algorithm specific integrated circuits (i.e., ASICs) or other types of hardware or firmware may be used to accomplish the same functions without departing from the scope of the invention.

If implemented in software, the functional blocks and routines discussed herein may be stored in any computer readable memory such as on a magnetic, an optical, or other storage medium, in a RAM or ROM of a computer, controller, field device, etc. Likewise, this software may be modulated on a carrier and delivered to a user or a device via any known or desired delivery method including, for example, over a communication channel such as a telephone line, the Internet, etc. Further, while described as being centralized within the sending communication gateway 26 and receiving communication gateway 42, the various functions of the communication technique described herein may be distributed amongst the controllers, workstations, etc. within the process control system shown in FIG. 1.

While the invention has been described with reference to specific examples, which are intended to be illustrative only and not to be limiting of the invention, it will be apparent to those of ordinary skill in the art that changes, additions or deletions may be made to the disclosed embodiments without departing from the spirit and the scope of the invention.

What is claimed is:

1. A method of transmitting data through a communication link having a bandwidth using a plurality of communication connections via the communication link, the method comprising the steps of:

associating each one of a plurality of worker objects for each one of the plurality of communication connections, wherein each worker object comprises an abstraction that represents collections of methods or processes and each worker object is encapsulated along with data needed to carry out the method or process of the worker object;

distributing the data amongst the worker objects;

forming messages using the distributed data within each respective worker object of the plurality of worker objects, based on a parameter of the respective worker object;

wherein a first worker object has a first parameter value configured to establish a first respective predetermined portion of the bandwidth and a second worker object has a second parameter value configured to establish a second respective predetermined portion of the bandwidth which is different from the first respective predetermined portion of the bandwidth;

delivering the messages formed within each worker object to an underlying layer of the plurality of communication connections so that each communication connection uses no more than the respective predetermined portion of the bandwidth; and allocating the predetermined portion of the bandwidth to each of the plurality of communication connections.

2. The method of claim 1, wherein the step of allocating the predetermined portion of the bandwidth to each of the plurality of communication connections includes the step of allocating different predetermined portions of the bandwidth to two of the plurality of communication connections.

3. The method of claim 1, wherein the step of allocating the predetermined portion of the bandwidth to each of the plurality of communication connections includes the step of setting a time between calls parameter for each of the plurality of communication connections.

4. The method of claim 1, wherein the step of allocating the predetermined portion of the bandwidth to each of the plurality of communication connections includes the step of setting a message size parameter for each of the plurality of communication connections.

5. The method of claim 1, wherein the step of allocating the predetermined portion of the bandwidth to each of the plurality of communication connections includes the step of setting a sending buffer size for each of the plurality of communication connections.

6. The method of claim 1, wherein the step of associating the worker object for each one of the plurality of communication connections includes the step of using the worker object to produce one of the plurality of communication connections.

7. The method of claim 1, further comprising the step of partitioning the data to form a plurality of partitioned data streams prior to distributing the data to the worker objects.

8. The method of claim 7, wherein the step of partitioning the data to form the plurality of partitioned data streams prior to distributing the data amongst the worker objects includes the step of partitioning the data based on a type of data.

9. The method of claim 7, wherein the step of partitioning the data to form the plurality of partitioned data streams includes the step of establishing a one-to-one correspondence between the plurality of partitioned data streams and the worker objects.

10. The method of claim 1, wherein the step of distributing the data to the worker objects includes the step of transferring a subset of the data to one of the worker objects in response to a request for data from the one worker object.

11. The method of claim 1, wherein the step of distributing the data to the worker objects includes the step of using a data transmission object.

12. The method of claim 1, wherein the step of forming the messages using the distributed data within each worker object includes the step of forming the messages within each worker object using a parameter of the worker object that controls the size of the messages.

13. The method of claim 1, wherein the step of delivering the messages formed within one of the worker objects includes the step of delivering the messages formed within the one worker object to the underlying layer based on a parameter of the one worker object that affects the rate at which the messages are delivered to the underlying layer.

14. The method of claim 13, wherein the step of delivering the messages formed within the one worker object to the underlying layer based on the parameter of the one worker object that affects the rate at which the messages are delivered to the underlying layer includes the step of using a time between calls parameter.

15. The method of claim 1, wherein the step of allocating the predetermined portion of the bandwidth to each of the plurality of communication connections includes the step of setting a message size parameter and a time between calls parameter for each of the plurality of communication connections.

16. A system for transmitting data through a communication link having a bandwidth using a plurality of communication connections via a communication link, the system comprising:
a communication object that distributes the data amongst the plurality of communication connections; and
a plurality of worker objects, wherein each worker object is associated with one of the plurality of communication connections and is configured to form messages using the data distributed to the communication connection associated with that worker object based on a parameter of that worker object, and wherein each worker object comprises an abstraction that represents collections of methods or processes and each worker object is encapsulated along with data needed to carry out the method or process of the worker object,
wherein a first worker object has a first parameter value configured to establish a first respective predetermined portion of the bandwidth and a second worker object has a second parameter value configured to establish a second respective predetermined portion of the bandwidth which is different from the first respective predetermined portion of the bandwidth, and
wherein each worker object is configured to deliver the messages formed within that worker object to an underlying layer of the plurality of communication connections so that each communication connection uses no more than the respective predetermined portion of the bandwidth allocated to that communication connection.

17. The system of claim 16, wherein each of the plurality of worker objects is adapted to produce a communication connection.

18. The system of claim 16, wherein the communication object
transfers a portion of the data to one of the plurality of worker objects in response to a request for data from the one worker object.

19. The system of claim 16, wherein the communication object is a data transmission object.

20. The system of claim 16, wherein each of the plurality of worker objects includes a set of uniquely configurable communication parameters.

21. The system of claim 20, wherein the set of uniquely configurable communication parameters includes a parameter that controls the size of the messages.

22. The system of claim 20, wherein the set of uniquely configurable communication parameters includes a parameter that controls the rate at which the messages are delivered to the underlying layer.

23. The system of claim 22, wherein the parameter that controls the rate at which the messages are delivered to the underlying layer is a time between calls parameter.

24. The system of claim 20, wherein the set of uniquely configurable communication parameters includes a parameter that controls a buffer size.

25. The system of claim 16, wherein the communication object partitions the data to form a plurality of partitioned data streams prior to distributing the data to the plurality of communication connections.

26. The system of claim 25, wherein the communication process partitions the data based on a type of data.

27. The system of claim 25, wherein the communication object establishes a one to one correspondence between the plurality of partitioned data streams and the plurality of worker objects.

28. A system for transmitting data through a communication link using a plurality of communication connections via the communication link having a bandwidth, the system comprising:
a communication process configured to partition the data to form a plurality of partitioned data streams; and
a plurality of worker processes, wherein each one of the plurality of worker processes is configured to have a set of uniquely configurable communication parameters, is configured to receive the partitioned data from the communication process, is configured to form messages using the partitioned data, is configured to deliver the messages containing the partitioned data to an underlying layer of the plurality of communication connections based on the set of uniquely configurable communication parameters for that worker process, and is configured as an abstraction that represents collections of methods or processes, each worker process encapsulated along with data needed to carry out the method or process of the worker process,
wherein a first worker object has a first parameter value configured to establish a first respective predetermined portion of the bandwidth and a second worker object has a second parameter value configured to establish a second respective predetermined portion of the bandwidth which is different from the first respective predetermined portion of the bandwidth.

29. The system of claim 28, wherein the communication process is based on a data transmission object.

30. The system of claim 28, wherein the communication process partitions the data based on a type of data.

31. The system of claim 28, wherein each of the plurality of worker processes is based on a worker object.

32. The system of claim 28, wherein the set of uniquely configurable communication parameters includes a parameter that controls the rate at which the messages are delivered to the underlying layer.

33. The system of claim 32, wherein the parameter that controls the rate at which the messages are delivered to the underlying layer is a time between calls parameter.

34. The system of claim 28, wherein the set of uniquely configurable communication parameters includes a message size parameter.

35. The system of claim 28, wherein the set of uniquely configurable communication parameters includes a sending buffer size parameter.

36. The system of claim 28, wherein there is a one-to-one correspondence between the plurality of worker processes, the plurality of partitioned data streams and the plurality of communication connections.

37. A system for transmitting, data through a communication link having a bandwidth, comprising:
a communication station having a processor and a memory communicatively coupled to the processor, wherein the processor is programmed to provide a plurality of worker objects, wherein each one of the plurality of worker objects is configured to form messages using one of a plurality of partitioned data streams, to produce a separate communication connection through the communication link, and configured as an abstraction that represents collections of methods or processes, each worker object encapsulated along with data needed to carry out the method or process of the worker object,
wherein a first worker object has a first parameter value configured to establish a first respective predetermined portion of the bandwidth and a second worker object has a second parameter value configured to establish a second respective predetermined portion of the bandwidth which is different from the first respective predetermined portion of the bandwidth,
and wherein each of the plurality of worker objects includes a set of communication connection parameters that are uniquely configurable to determine the manner in which the messages are sent by each of the plurality of worker objects to an underlying layer of the communication link.

38. The system of claim 37, wherein the communication station is a sending communication gateway.

39. The system of claim 37, wherein the communication station is a receiving communication gateway.

40. The system of claim 37, wherein each of the separate communication connections uses a connection-oriented communication protocol.

41. The system of claim 37, wherein the set of communication connection parameters includes a message size parameter.

42. The system of claim 37, wherein the set of communication connection parameters includes a message size parameter and a time between calls parameter.

43. The system of claim 37, wherein the set of communication connection parameters includes a sending buffer size parameter.

44. The system of claim 37, wherein the processor is further programmed to cause messages containing a particular type of data to be sent through a particular one of the separate communication connections.

45. The system of claim 37, wherein the processor is further programmed to partition the data into the plurality of partitioned data streams based on type of data and to transfer partitioned data from one of the plurality of partitioned data streams to one of the plurality of worker objects.

46. The system of claim 45, wherein there is a one-to-one correspondence between the plurality of partitioned data streams, the plurality of worker objects and the separate communication connections.

47. The system of claim 37, wherein the set of communication connection parameters includes a time between calls parameter.

48. A method of transmitting data through a communication link by a communication gateway device, comprising the steps of:
associating each one of a plurality of worker processes to each one of a plurality of communication connections, wherein each one of the plurality of worker processes is configured to receive data, messages of the data, to send the messages containing the data to an underlying layer of the communication link having a bandwidth, and configured as an abstraction that represents collections of methods or processes, each worker process encapsulated along with data needed to carry out the method or process of the worker process;
uniquely configuring a set of communication connection parameters uniquely associated with each of the plurality of worker processes;
producing a separate communication connection for each one of the plurality of worker processes,
wherein a first worker object has a first parameter value configured to establish a first respective predetermined portion of the bandwidth and a second worker object has a second parameter value configured to establish a second respective predetermined portion of the bandwidth which is different from the first respective predetermined portion of the bandwidth; and
delivering the messages from at least one of the plurality of worker processes to the underlying layer for transmission through the communication link based on the respective set of communication connection parameters uniquely associated with the at least one of the plurality of worker process.

49. The method of claim 48, wherein the step of establishing the plurality of worker processes that each receives the data and that each sends the messages to the underlying layer of the communication link includes the step of assigning a particular type of data to each of the plurality of worker processes.

50. The method of claim 48, wherein the step of uniquely configuring the set of communication connection parameters uniquely associated with each of the worker processes includes the step of configuring a message size parameter for each of the worker processes.

51. The method of claim 48, wherein the step of uniquely configuring the set of communication connection parameters uniquely associated with each of the worker processes includes the steps of configuring a message size parameter for each of the worker processes and configuring a time between calls parameter for each of the worker processes.

52. The method of claim 48, wherein the step of uniquely configuring the set of communication connection parameters uniquely associated with each of the worker processes includes the step of configuring a sending buffer size parameter for each of the worker processes.

53. The method of claim 48, wherein the step of uniquely configuring the sets of communication connection parameters uniquely associated with each of the worker processes includes the step of configuring the sets of communication connection parameters to provide a reserved bandwidth for retransmissions.

54. The method of claim 48, wherein the step of delivering the messages from the one of the worker processes to the underlying layer for transmission through the communication link based on the set of communication connection parameters uniquely associated with the one worker process includes the step of using a timer function within the one worker process to control the rate at which the one worker process delivers the messages to the underlying layer.

55. The method of claim 48, wherein the step of uniquely configuring the set of communication connection parameters uniquely associated with each of the worker processes includes the step of configuring a time between calls parameter for each of the worker processes.

* * * * *

UNITED STATES PATENT AND TRADEMARK OFFICE
CERTIFICATE OF CORRECTION

PATENT NO. : 7,839,890 B1  Page 1 of 1
APPLICATION NO. : 09/704936
DATED : November 23, 2010
INVENTOR(S) : Lee A. Neitzel et al.

It is certified that error appears in the above-identified patent and that said Letters Patent is hereby corrected as shown below:

At Column 23, line 8, "transmitting," should be -- transmitting --

Signed and Sealed this
Seventh Day of June, 2011

David J. Kappos
*Director of the United States Patent and Trademark Office*